United States Patent [19]
Tel

[11] Patent Number: 5,719,939
[45] Date of Patent: Feb. 17, 1998

[54] SYSTEM AND METHOD OF VERIFYING THE LEGITIMACY OF A PRODUCT AGAINST FORGERY

[75] Inventor: Teunis Tel, Groningen, Netherlands

[73] Assignee: Unicate B.V., Groningen, Netherlands

[21] Appl. No.: 290,207

[22] Filed: Aug. 15, 1994

Related U.S. Application Data

[62] Division of Ser. No. 955,711, Dec. 15, 1992, Pat. No. 5,354,097.

[30] Foreign Application Priority Data

Jun. 15, 1990 [NL] Netherlands .................... 9001368

[51] Int. Cl.$^6$ ........................................ B42D 15/10
[52] U.S. Cl. ........................ 380/23; 283/73; 283/107
[58] Field of Search ........................ 380/23; 283/72, 283/73, 83, 107

[56] References Cited

U.S. PATENT DOCUMENTS

| | | | |
|---|---|---|---|
| 3,636,318 | 1/1972 | Lindstrom et al. | 253/61.12 M |
| 3,694,285 | 9/1972 | Appel et al. | 156/179 |
| 4,218,674 | 8/1980 | Brosow et al. | 340/149 A |
| 4,423,415 | 12/1983 | Goldman | 340/825.34 |
| 4,682,794 | 7/1987 | Margolin | 283/82 |
| 5,010,345 | 4/1991 | Nagy | 341/65 |
| 5,176,405 | 1/1993 | Kaule et al. | 283/83 |

FOREIGN PATENT DOCUMENTS

| | | |
|---|---|---|
| 0 054 071 | 12/1985 | European Pat. Off. . |
| 0 384 274 | 8/1990 | European Pat. Off. . |
| 1 931 536 | 2/1970 | Germany . |

*Primary Examiner*—Gilberto Barrón, Jr.
*Attorney, Agent, or Firm*—Bell Seltzer Intellectual Property Law Group of Alston & Bird llp

[57] ABSTRACT

A product, such as a credit card, passport, or bank note, is secured against forgery or fraud by the provision of a unique pattern of overlying individual fibers which are embedded in a transparent base material, and such that the fibers form differing geometrical configurations which are optically scannable through a surface of the transparent base material. The product is thus made unique and impossible to forge, and its authenticity may be verified by initially scanning the geometrical configurations, with the scanned information being converted into digital data which may be compressed and encrypted, and then stored in a permanent memory. Following the distribution of the product, an inspector may scan the product and compare the obtained data with the stored data to thereby verify the authenticity of the product.

8 Claims, 2 Drawing Sheets

SYSTEM AND METHOD OF VERIFYING THE LEGITIMACY OF A PRODUCT AGAINST FORGERY

CROSS REFERENCE TO RELATED APPLICATION

This is a division of application Ser. No. 07/955,711, filed Dec. 15, 1992 now U.S. Pat. No. 5,354,097.

BACKGROUND OF THE INVENTION

This invention relates to a system and method of verifying the legitimacy of a product, such as an object or document, against forgery and to a method of putting into public circulation and checking said product.

DISCUSSION OF THE PRIOR ART

A product of the above-mentioned type can be, for example, a passport, a banker's card, a credit card, a security such as a banknote, a cheque or a share certificate, a product label, a travel card such as an airline ticket, or an admission ticket, but it can also be a painting, a compact disc, a music-, photo-, film- or video cassette, or a car.

If, by way of example, a passport is considered, it is provided with identifying marks with the object of safeguarding use of the document by making it unique and confined to one person. These identifying marks can comprise a specific layout of the document, a person's name, a passport photograph, an alphanumeric code, signatures, stamps and the like.

Another example of a document is a banknote, in the case of which efforts are made to counteract forgery by providing a watermark and other identifying marks which are difficult to copy, and also a unique serial number.

Some of the provided identifying marks are generally applied by means of very advanced equipment and techniques—in particular in the case of banknotes—in order to minimize the chance of illegal duplication of the documents. The price which has to be paid for these security measures is consequently high.

However, none of the above-mentioned measures provides adequate protection against the forgery of individual products, since in the first place the identifying marks can be copied with little or great effort. Further, when e.g. a passport is being checked the passport number or the person's name specified are used to check in a data file whether the passport number and the person's name exist and go together. This check does not, however, rule out the possibility that the person using the passport could be a different person from the one to whom the passport belongs, a fraud which can remain unnoticed through, for example, an indiscernible change of the passport photograph in the passport. It is also possible for the document itself to have been forged in such a way that this is not noticed by the authority checking it.

Secondly, a check on a specific combination of identifying marks is often impossible in practice. As already described above, it cannot be ruled out in the case of, for example, a passport that the document itself has been forged or that one of the identifying marks placed on it, such as a passport photograph, does not form a unit with the other identifying marks with which it is provided. The reason for this is that the data file forming the reference for the check contains purely alphanumeric information such as names and numbers and does not have any graphic information relating to, for example, the picture on a passport photograph or a signature.

Besides, it is generally not possible to check whether a specific product is genuine by means of a data file, but only by a human or mechanical assessment of a number of identifying marks of the product which are the same for all such products, such as a line pattern, a colour, a watermark or the like.

From U.S. Pat. No. 4,218,674 a system comprising an object, in particular a document, secured against fraud is known, which object is provided with random imperfections consisting of fibers of a magnetic or magnetizable material which can be detected when measuring along a predetermined measuring track on the object. The measured imperfections are converted into a row of electric pulses and synchronized with a timing pulse also derived from marks on the object. Such a security system obviously does not function properly when the object has been subjected to external magnetic fields and therefore is of limited practical value. Besides, only a track is scanned, which provides only a limited quantity of security data for securing the object.

In the known method, the obtained security data are not combined with any data related to possible identifying marks on the product, and although the authenticity of the product can be shown by proving by way of comparison with previously recorded security data the authenticity of the security data obtained from the product, this provides no proof whatsoever of the identity of the user of the product without further precautions being taken.

Another disadvantage of the known system resides in the fact that no measures are taken to reduce the obtained quantity of security data to a more compressed form. Consequently, a relatively large storage capacity of a computer is used and a relatively long processing time will be necessary to compare a read security code with a large number of previously stored codes.

Last but not least, for an expert forger in the field of electronics and computers it does not present many problems to prepare a forged document which will produce a valid security code and visually cannot be distinguished from an authentic one. This could be accomplished, by example, by breaking into the computer where a list of security code is stored, by tapping the electrical connection between a measuring station and said computer, or by analysis of the magnetic properties of an authentic document.

SUMMARY OF THE INVENTION

The object of the invention is in the first place to provide a system of verifying the legitimacy of a product against forgery, which product is provided with a unique mark which cannot be copied.

This object is attained according to the invention in that the system comprises a body member including a surface, a plurality of overlying individual fibers which are randomly disposed so as to define a number of differing geometrical configurations, and a transparent base material completely encasing and fixedly supporting said fibers so that said fibers are visible on said surface, means for optically scanning said surface of said body member, means for converting the optical information obtained by said optical scanning means into digital data, and comparing means for comparing the digital data with previously stored information in storage means so as to permit verification of the legitimacy of said product.

If the pattern, in which many parts of fibres constituting a nonwoven material or a nonwoven lie arbitrarily directed, is incorporated in a surface of an object or document, the latter is provided with a unique mark which cannot be copied. The product is thus itself made unique and impossible to forge; the pattern forms, as it were, the fingerprint of the product.

For a definition of nonwovens reference is made here to international standard ISO 9092. Great advantages of the use of nonwovens are their low thickness, the very low mass per unit volume, and the low cost.

The transparent material in which the nonwoven material is embedded can, in thin products or parts thereof, take the form of a window where the pattern of fibres is visible both from the front and the back side of the body member.

The unique pattern must be constant in all circumstances of use, such as varying ambient temperature, humidity, mechanical stress, chemical, electric and magnetic influences and the like. It has been found that a particularly stable pattern is obtained if the core of the fibres is of polyester, and is surrounded by a polyamide covering.

Optically scanning the pattern enables a noncontact scan where only the positions of the fibers play a role and imposing wear on the pattern is avoided. When the entire pattern is scanned and not just a track across the pattern, depending on the resolution with which it takes place, much information is obtained which, as a whole, is quite unique.

The scanning means—e.g. a high resolution camera—scan the pattern at an angle which for practical reasons will be close to or equivalent to 90°, but may also be chosen much less, depending mainly on the angle of refraction of the transparent material.

Apart from the pattern at least one additional identifying mark may be scanned. In most cases this mark will be the appearance of the object as a whole, while in the case of an object being an identity card said mark may be a photograph of the owner.

The converting means then convert the output, e.g. pixel data, of the scanning means into a suitable form for processing the data in data compressing means, where the original quantity of digital data is converted into a reduced quantity of equivalent digital data by processing the data which predetermined algorithms. The resulting reduced quantity of digital data is then stored in a permanent memory, where a minimal quantity of memory is required for recording the data.

The comparing means of the system enable a user to utilize the system for security checks. Such a check can be done quickly, since only reduced quantities of data need to be compared. The system may comprise central or distributed storage means to be able to use the system at arbitrary places. In both cases a copy of the stored data must be transported over large distances which involves a risk of the information falling into the wrong hands. To avoid this, in a preferred embodiment the system comprises data encryption means for converting the reduced quantity of digital data into coded digital data, vice versa.

To enable a visual check performed by a security person, the system can reassemble the original optical information from the data stored in the memory of the storage means by reverse operation of the converting means, the data compressing means and possibly the data encryption means.

The pattern of nonwoven material comprises several layers and consequently has a three-dimensional structure. It is advantageous to scan this pattern from at least two different angles, because this produces different information which is correlated by the arrangement of the fibres, and which is more unique than the information derived from a single scanning of the pattern.

Advantageously, the converting means are arranged to determine one or more characteristics of a polygon defined by fibre parts of the nonwoven material on the basis of the optical information, and to convert these characteristics into digital data, vice versa.

In a preferred method for putting into public circulation and checking the product with the system according to the invention, prior to the issue of the object or document, the related reduced quantity of possibly coded data is recorded in the memory of the storage means, which memory is retained at a data keeper and when the object or document is being checked its optical information thus obtained is processing by the converting means, the data compressing means and possibly the data encryption means, and the resulting data is compared with the data recorded in the memory of the storage means or a copy thereof. The data keeper, an independent person or institute, plays an important role in ensuring the integrity of the data obtained prior to the issue of the object or document, and can provide material evidence that an object being checked is forged or not.

The claims and advantages will be more readily appreciated as the same becomes better understood by reference to the following detailed description and considered in connection with the accompanying drawings in which like reference symbols designate like parts.

DESCRIPTION OF THE PREFERRED EMBODIMENTS

Figure 1:
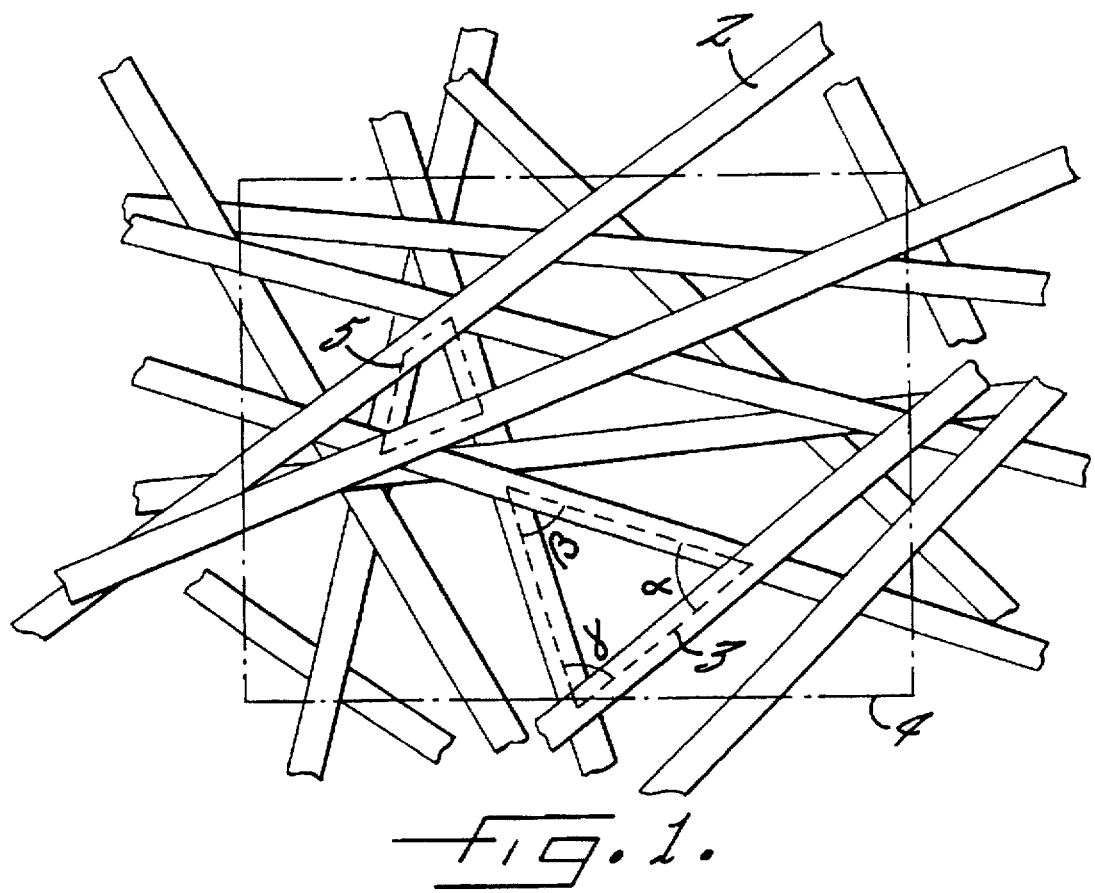
FIG. 1 shows a first pattern of fibres on a greatly enlarged scale according to the invention.

FIG. 1 shows a part of a large, arbitrary pattern of intersecting fibres 2, which pattern continues in an arbitrary manner towards all sides outside the figure. The fibres 2 are fixed relative to each other. A confined smaller pattern is obtained, for example, by cutting through the fibres 2 along the dashed and dotted line 4. The confined pattern thus formed can be fixed in a surface of an object or document.

It should be pointed out here that it is irrelevant for the invention whether or not the fibres are the same thickness as each other, whether or not the fibres are the same thickness over the entire length, whether the fibres are straight or bent, and whether or not they intersect one another.

In FIG. 1 the fibres 2 define many different polygons, two of which are indicated with dashed lines. Thus, a triangle 3 and quadrangle 5 can be recognized, which are characteristic for the specific pattern of nonwoven material. Attributes of such polygons, e.g. angles $\alpha$, $\beta$ and $\gamma$ of triangle 3, may be evaluated and used for characterization of the pattern.

Figure 2:
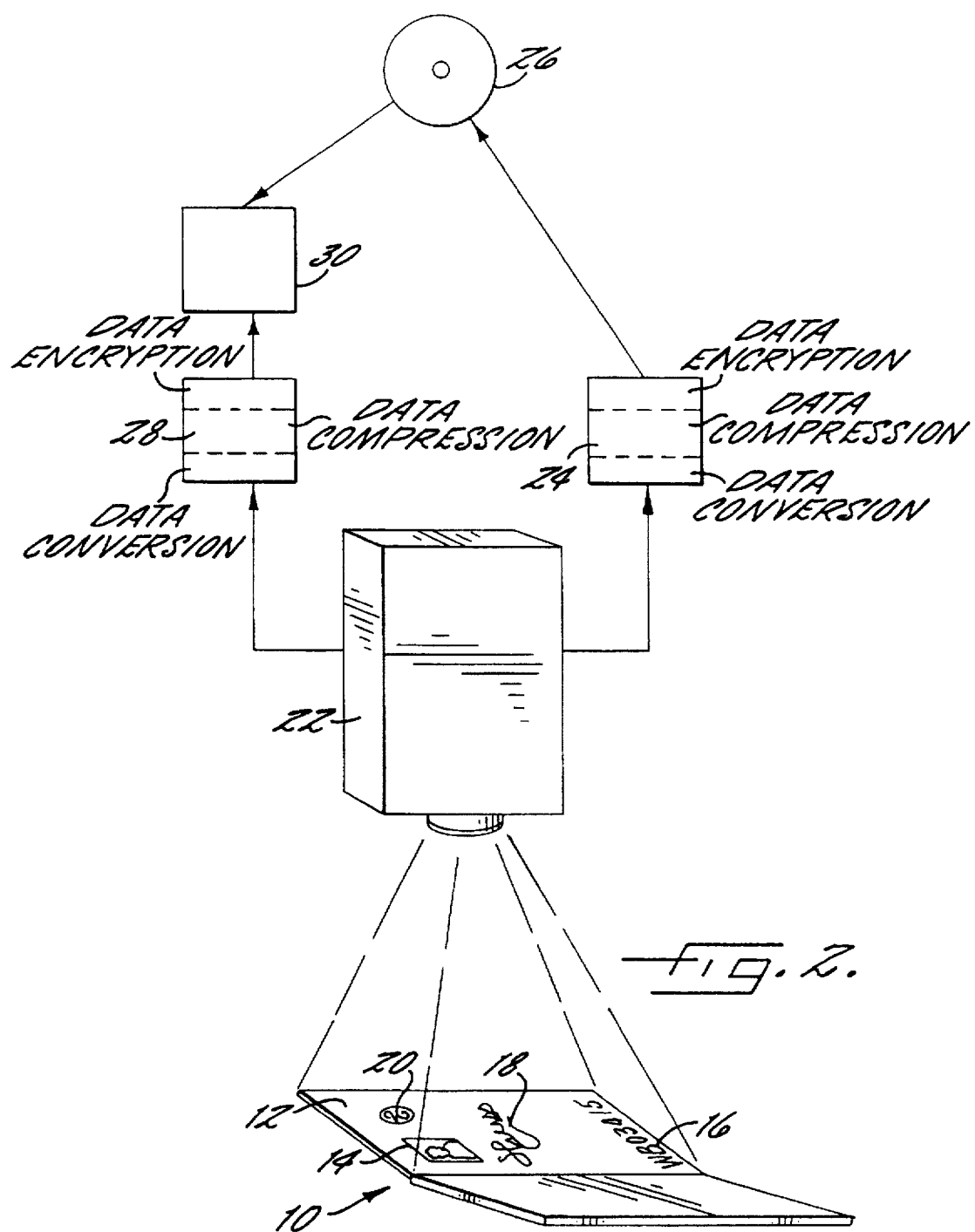
FIG. 2 illustrates a method according to the invention for issuing and checking a passport.

FIG. 2 shows a passport 10 in which a page 12 is provided with a number of identifying marks. A passport photograph 14, an alphanumeric code 16, a signature 18 and a pattern 20 are provided on the page 12. For the sake of clarity, the pattern 20 is shown relatively large, but in a practical application the largest dimension need not be greater than a few mm.

When the passport 10 is being issued not only the passport photograph 14, but also the signature 18 and the pattern 20 of fibres on the page 12 are optically scanned by a camera 22, and after data conversion, data compression and data encryption, which operations are performed by means symbolized by block 24, the resulting coded data are stored in a permanent memory, symbolized in FIG. 2 by disk 26. Such a permanent, read-only memory may comprise an optical WORM (Write Once Read Many) device.

Disk 26 or a copy thereof can be used at the place where the check is taking place for checking passports presented at that place. The information obtained there by a check scan with camera 22, after data conversion, data compression and data encryption, jointly symbolized by block 28, is compared in comparison element 30 with the coded data stored on the disk 26, as a result of which fraud which may have occurred with the passport can be established.

It is also possible for the purpose of checking by means of data communication to consult a central memory which is accessible from several points.

If it is found during the check that one or more identifying marks of the combination of scanned identifying marks differ from those of a combination of the recorded identifying marks, it is concluded that a forged passport is being presented. If, on the other hand, the combination of checked identifying marks corresponds fully to the combination of recorded identifying marks, it is then concluded that the passport is not forged.

The coded data of at least as many identifying marks of a product as are necessary to establish forgery is stored in the memory.

By way of example, another application of the system according to the invention is the issue of a registration certificate for a car, which is provided with a chassis number as usual, and a pattern of nonwoven material. The registration certificate is also provided with a pattern of nonwoven material. At issuing the registration certificate together with the car both patterns and additional identifying marks are scanned and the coded scan data, together with the chassis number, are recorded in a database. This information now is inseparably combined and can be found in the database. It at a check the information is not found, the originally scanned pictures can be found and it is easily discovered where and how forgery took place.

Still another application of the system and the method according to the invention is the production of trade mark labels for clothes, etc. As a first step in the process a data keeper, also referred to as a security printer, produces for a client a series of trade mark labels with a pattern of nonwoven material and a code number. The security printer fully automatically records the pattern and the code number by means of a digital camera, and stores the concerning coded data on a WORM optical disk. Next, the security printer delivers the trade mark labels and the optical disk or a copy thereof to the client and retains a copy of the optical disk or the original thereof, respectively. The client then processes the trade mark labels in the clothes and distributes the clothes. If there is a suspicion that certain batches of clothes are imitations, an inspector scans the label of a piece of clothing with a digital camera, which scan is sent by modem in coded form to a central place, where it is compared with the data recorded on the optical disk. If the scanned data are not found in the database, it can be proven that the piece of clothing is an imitation without any doubt, since the security printer possess the original scanned data.

In accordance with the present invention, both the security printer and his customer (i.e. the firm bringing the product to the market) may have a copy of the unique coded data for the product that is secured against forgery. Following distribution of the product, an inspector may scan the product and compare the obtained data with the stored unique coded data. In this way, not only the firm bringing the product to the market, but also the original security printer can prove the legitimacy or forgery of the product.

If the clothes are stolen and the trade mark labels are still fixed to the clothes, a proof of the batch from which the clothes originate can be established at any time.

While the invention has been described and illustrated in its preferred embodiments, it should be understood that departures may be made therefrom within the scope of the invention, which is not limited in the details disclosed herein.

What is claimed is:

1. A system for verifying the legitimacy of a product against forgery and comprising
   a body member including a surface, a plurality of overlying individual fibers which are randomly disposed so as to define a number of differing geometrical configurations, and a transparent base material completely encasing and fixedly supporting said fibers so that said fibers are visible on said surface,
   scanning means for optically scanning said surface of said body member,
   converting means for converting the optical information obtained by said optical scanning means into digital data, and
   comparing means for comparing the digital data with previously stored information in storage means so as to permit verification of the legitimacy of said product, wherein said converting means includes means for converting the optical data into digital data representative of the geometrical configurations formed by the overlying fibers.

2. The system as defined in claim 1, wherein said converting means includes data compressing means for converting the original quantity of digital data into a reduced quantity of equivalent data, and data encryption means for converting the reduced quantity of data into coded digital date, and wherein
   said comparing means compares said coded digital data with previously stored information in a read only storage means.

3. The system as defined in claim 1, wherein said converting means includes means for converting the optical data into digital data representative of the geometrical configurations of one or more polygons formed by the overlying fibers.

4. A method of verifying the legitimacy of a product against forgery, which product comprises a body member including a surface, a plurality of overlying individual fibers which are randomly disposed so as to define a number of differing geometrical configurations, and a transparent base material completely encasing and fixedly supporting said fibers so that said fibers are visible on said surface, the method comprising the steps of
   optically scanning said surface of said body member and including scanning said fibers,
   converting the optical information obtained by said optical scanning step into digital data, and
   comparing the digital data with previously stored information in storage means so as to permit verification of the legitimacy of said product, wherein the converting step includes converting the optical information into digital data representative of the geometrical configurations formed by the overlying fibers.

5. The method as defined in claim 4, wherein the optically scanning step includes scanning the fibers of said optically scannable portion from at least two different angles.

6. The method as defined in claim 4, wherein the converting step includes converting the optical information into digital data representative of the geometrical configurations of one or more polygons formed by the overlying fibers.

7. The method as defined in claim 4, wherein the converting step includes converting the original quantity of data into a reduced quantity of equivalent data, and then converting the reduced quantity of data into coded digital data.

8. A method of verifying the legitimacy of a product against forgery, which product comprises a body member including a surface, at least one identifying mark provided on said surface, a plurality of overlying individual fibers which are randomly disposed so as to define a number of differing geometrical configurations, and a transparent base material completely encasing and fixedly supporting said fibers so that said fibers are visible on said surface the method comprising the steps of optically scanning said surface of said body member and including scanning the at least one identifying mark and said fibers at the time of issuance of the product, converting the optical information obtained by said optically scanning step into digital data representative of the geometrical configurations formed by the overlying fibers, and including converting the original quantity of data into a reduced quantity of equivalent data, and then converting the reduced quantity of data into code digital data, storing the coded digital data in a permanent memory, and thereafter optically scanning said surface of said body member a second time, converting the optical information obtained by said second optically scanning step into digital data representative of the geometrical configuration formed by the overlying fibers, and including converting the original quantity of data into a reduced quantity of equivalent data, and then converting the reduced quantity of data into coded digital data, and comparing the coded digital data obtained from said second scanning step with the previously stored data in said memory so as to permit verification of the legitimacy of said product.

* * * * *